United States Patent
Wicks

(10) Patent No.: US 9,546,677 B2
(45) Date of Patent: Jan. 17, 2017

(54) METHODS AND SYSTEMS FOR POWERING A GENERATOR WITH A VEHICLE POWER TAKE-OFF

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/661,479

(22) Filed: Mar. 18, 2015

(65) Prior Publication Data

US 2016/0273574 A1 Sep. 22, 2016

(51) Int. Cl.
- *B60K 17/28* (2006.01)
- *F16C 1/06* (2006.01)
- *F16C 1/08* (2006.01)

(52) U.S. Cl.
CPC .............. *F16C 1/06* (2013.01); *B60K 17/28* (2013.01); *F16C 1/08* (2013.01)

(58) Field of Classification Search
CPC .... B60K 25/06; F02B 63/04; F02B 2063/045; Y10T 307/576; Y10T 307/522
USPC ............................. 180/53.5, 53.6, 53.62, 53.7
See application file for complete search history.

(56) References Cited

U.S. PATENT DOCUMENTS

| | | | |
|---|---|---|---|
| 2,712,109 A | 6/1955 | Graziose et al. | |
| 3,372,559 A | 3/1968 | Potter | |
| 4,285,279 A * | 8/1981 | Chiappetti | B60L 1/00 105/114 |
| 5,178,403 A * | 1/1993 | Kemner | B61D 49/00 180/165 |
| 5,476,150 A * | 12/1995 | Hurlburt | A01B 71/06 172/279 |
| 5,563,451 A * | 10/1996 | Furukawa | B60K 25/06 180/53.8 |
| 7,547,264 B2 * | 6/2009 | Usoro | B60K 25/02 180/53.5 |
| 7,690,451 B2 * | 4/2010 | Chiao | B60K 6/46 180/53.5 |
| 8,110,934 B2 * | 2/2012 | Gezel | F02B 63/04 290/1 R |
| 8,115,334 B2 * | 2/2012 | Vyas | B60K 6/46 307/10.1 |
| 2007/0233334 A1 * | 10/2007 | Kozarekar | B60K 6/445 701/22 |
| 2010/0305795 A1 * | 12/2010 | Kuang | B60K 35/00 701/22 |
| 2013/0199362 A1 * | 8/2013 | Hoover | F04B 1/20 91/499 |

FOREIGN PATENT DOCUMENTS

CN 203278379 U 11/2013

* cited by examiner

*Primary Examiner* — Toan To
(74) *Attorney, Agent, or Firm* — Julia Voutyras; Alleman Hall McCoy Russell & Tuttle LLP

(57) ABSTRACT

Methods and systems are presented for powering a generator via a flexible driveshaft coupled to a vehicle power take off unit. In one example, a flexible driveshaft with a non-rotatable outer sheath and inner, rotatable mandrel may be coupled to a generator complementary connector to power the generator with torque from a power take off unit.

20 Claims, 8 Drawing Sheets

METHODS AND SYSTEMS FOR POWERING A GENERATOR WITH A VEHICLE POWER TAKE-OFF

FIELD

The present description relates generally to methods and systems for powering a generator with a vehicle power take-off unit (PTU).

BACKGROUND/SUMMARY

Power from an engine is typically delivered to vehicle wheels to propel a vehicle. Additionally, engine power may be used to drive ancillary vehicle accessories such as air conditioning units and alternators. However, some vehicles include a power take off port located in the vehicle driveline between the engine and the wheels. The power take off unit (PTU) can be a source of power to a device that is external to the vehicle or to a device that may not be incorporated into a typical passenger vehicle. For example, a power take off port (included in the PTU) may power a hydraulic pump that lifts a snow plow or a hydraulic motor that turns a cement mixer. However, typical PTUs drive ancillary vehicle accessories via a linear drive shaft coupled from an output of the PTU to an input of the accessory, and thus cannot power the ancillary vehicle accessories on uneven surfaces.

In one example, the issues described above may be addressed by a kit comprising a generator including an input coupling and a flexible driveshaft comprising an outer sheath and a rotatable and flexible inner shaft, where a first end of the inner shaft is coupleable to the input coupling and a second end of the inner shaft is coupleable to an output coupling of a PTU of a vehicle. In this way, an ancillary vehicle accessory (e.g., the generator) may be powered by a vehicle PTU on an uneven, sloping, and/or slanted surface via the flexible driveshaft.

As one example, the flexible driveshaft may connect to the vehicle PTU in either a linear or non-linear linkage. A complementary connector on the PTU may be located on a vehicle body or undercarriage of the vehicle. The first end of the inner shaft of the flexible driveshaft may include a first coupling element (e.g., a mechanical coupler) adapted to be directly and rotatably coupled with a complementary connector of the generator and the second end of the inner shaft of the flexible driveshaft may include a second coupling element (e.g., mechanical coupler) adapted to be directly coupled to the complementary connector of the PTU. By having a flexible driveshaft configured in this way, the generator may be placed independently relative to the position of the PTU. This may increase an ease of use for a user and thus the frequency of use of the PTU-driven generator system.

The above discussion includes recognitions made by the inventors and not admitted to be generally known. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
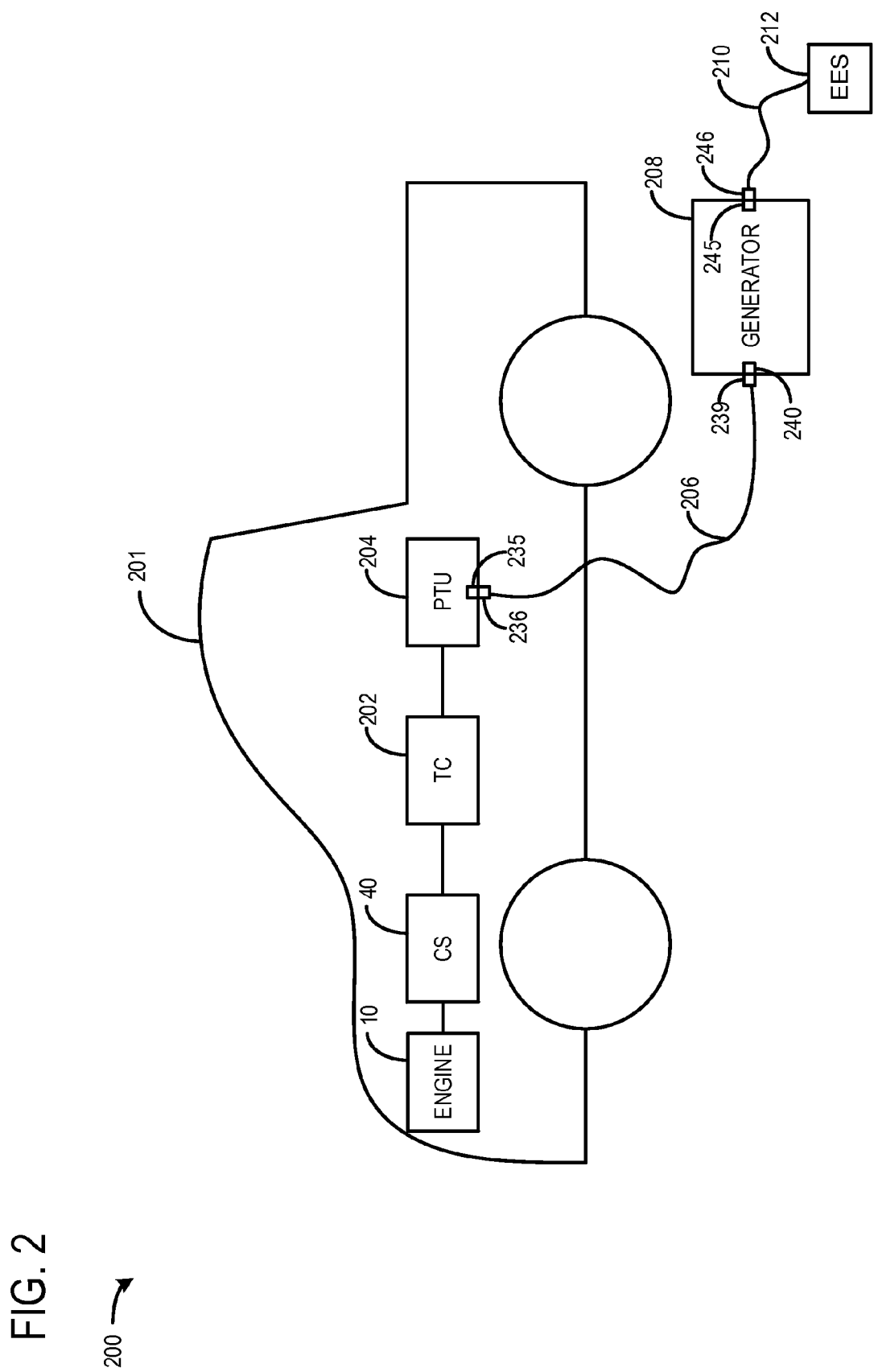
FIG. 2 depicts a vehicle including a power-transfer unit (PTU) and a kit including a flexible driveshaft and a generator.
Figure 3:
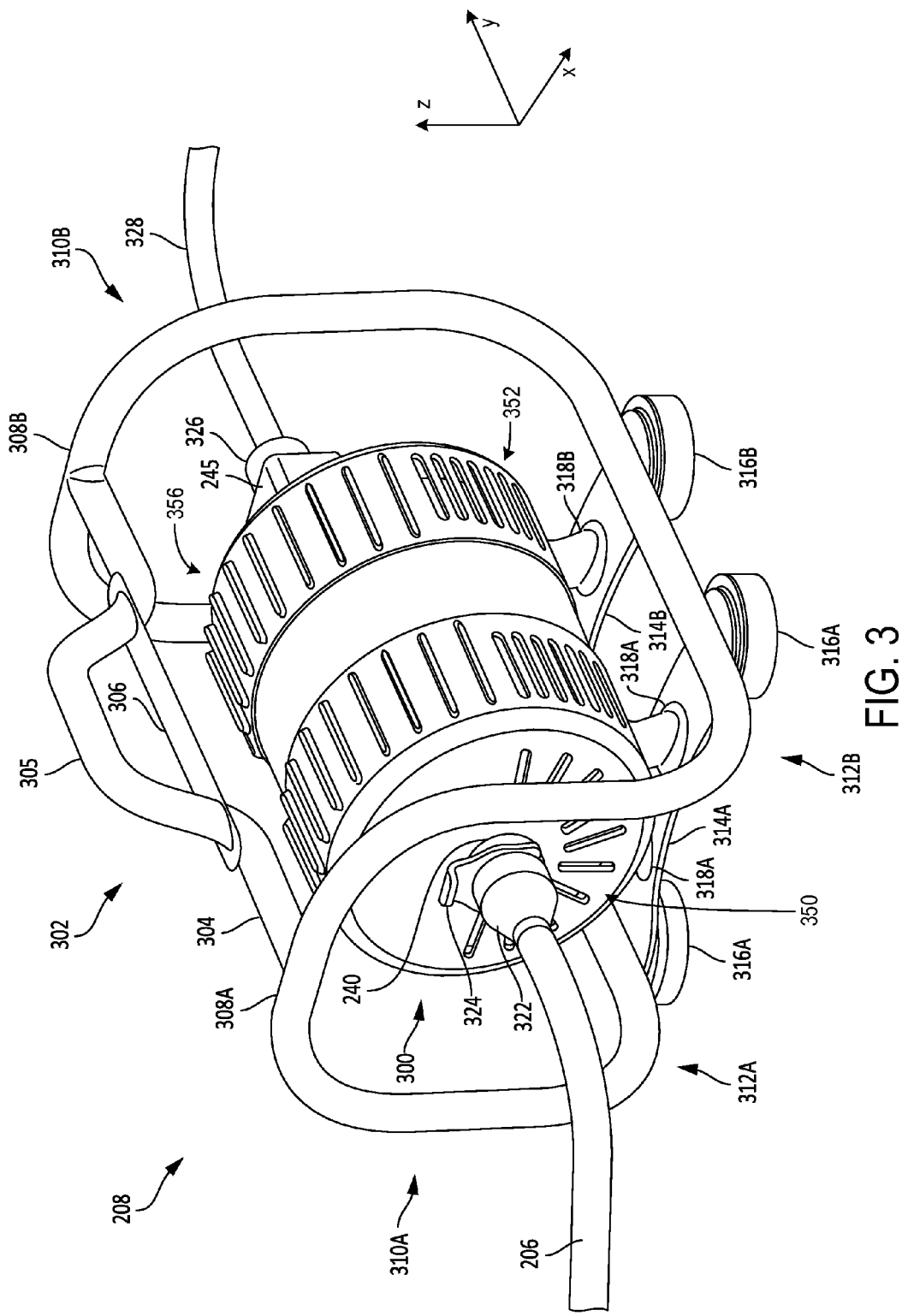
FIG. 3 depicts a detailed illustration of the generator and flexible driveshaft couplings.
Figure 4:
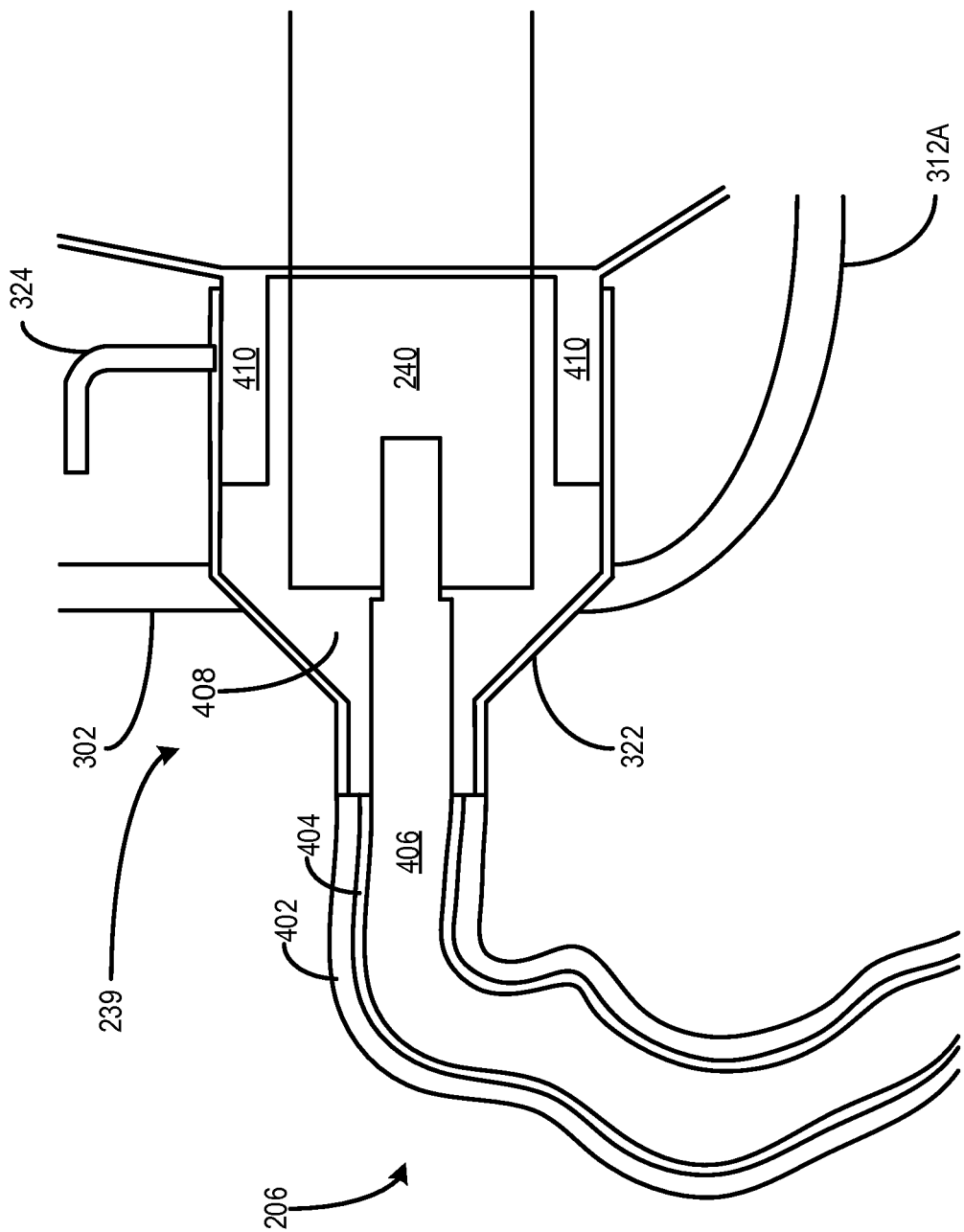
FIG. 4 depicts a detailed illustration of a connection between the flexible driveshaft and a complementary connector of the generator.
Figure 5:
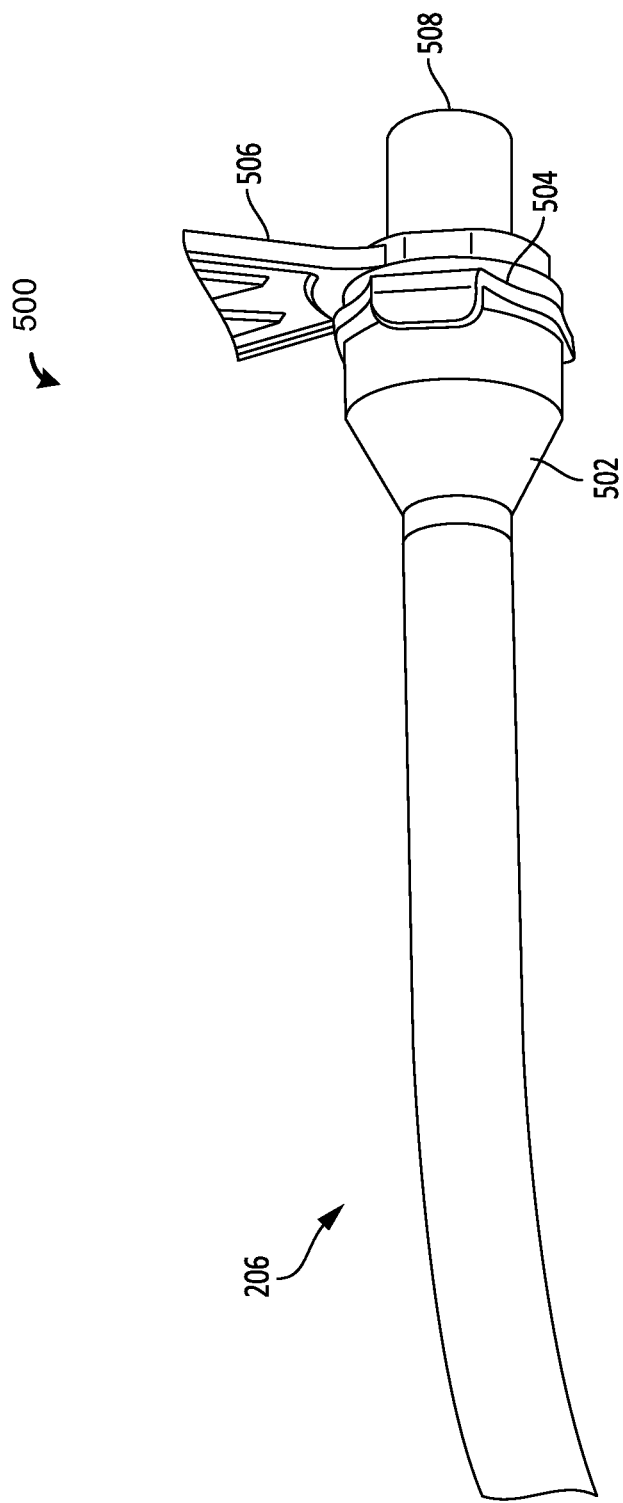
FIG. 5 depicts a detailed illustration of a connection between the flexible driveshaft and a complementary connector of the PTU.
Figure 6:
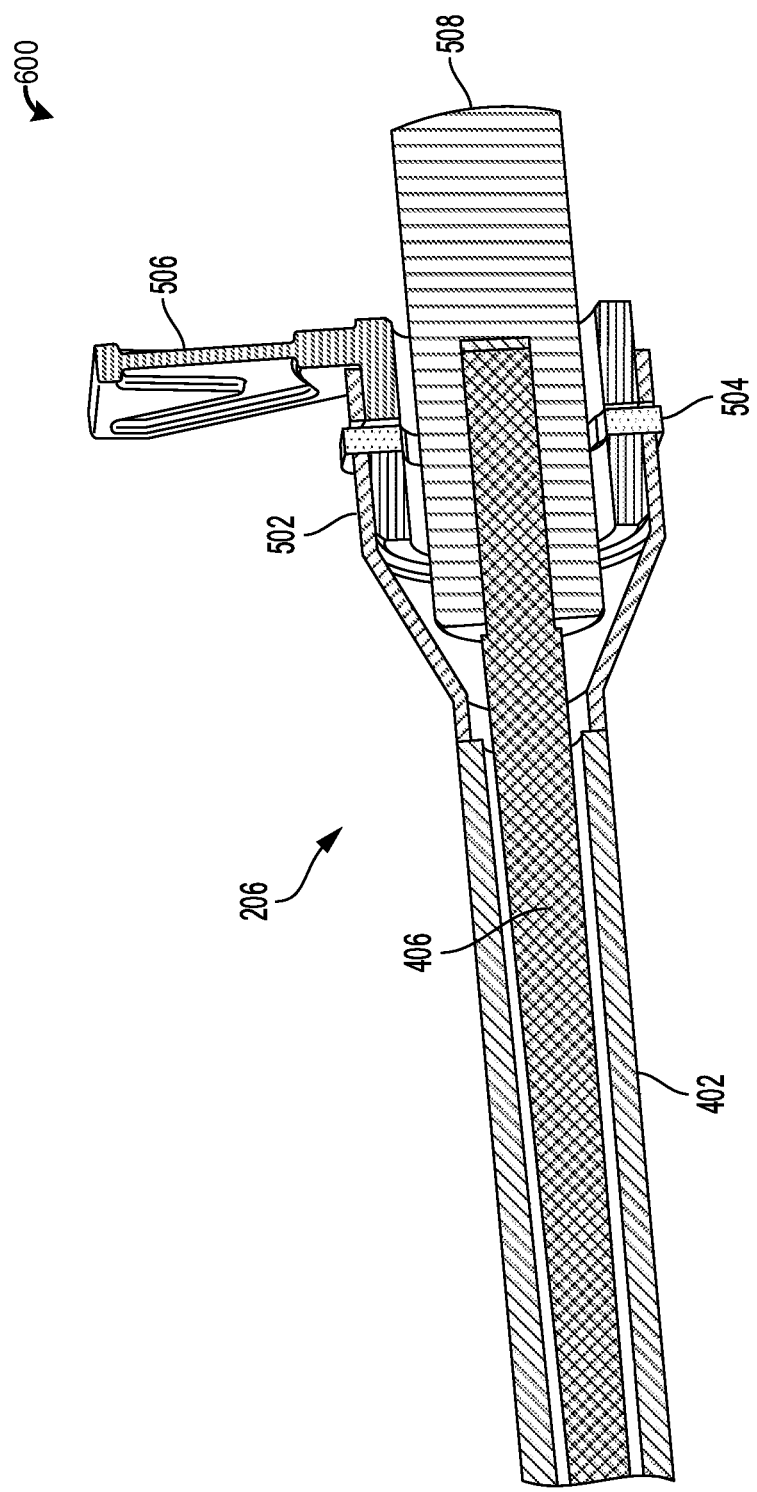
FIG. 6 depicts a cross-section of the connection between the flexible driveshaft and the complementary connector of the PTU.
Figure 7:
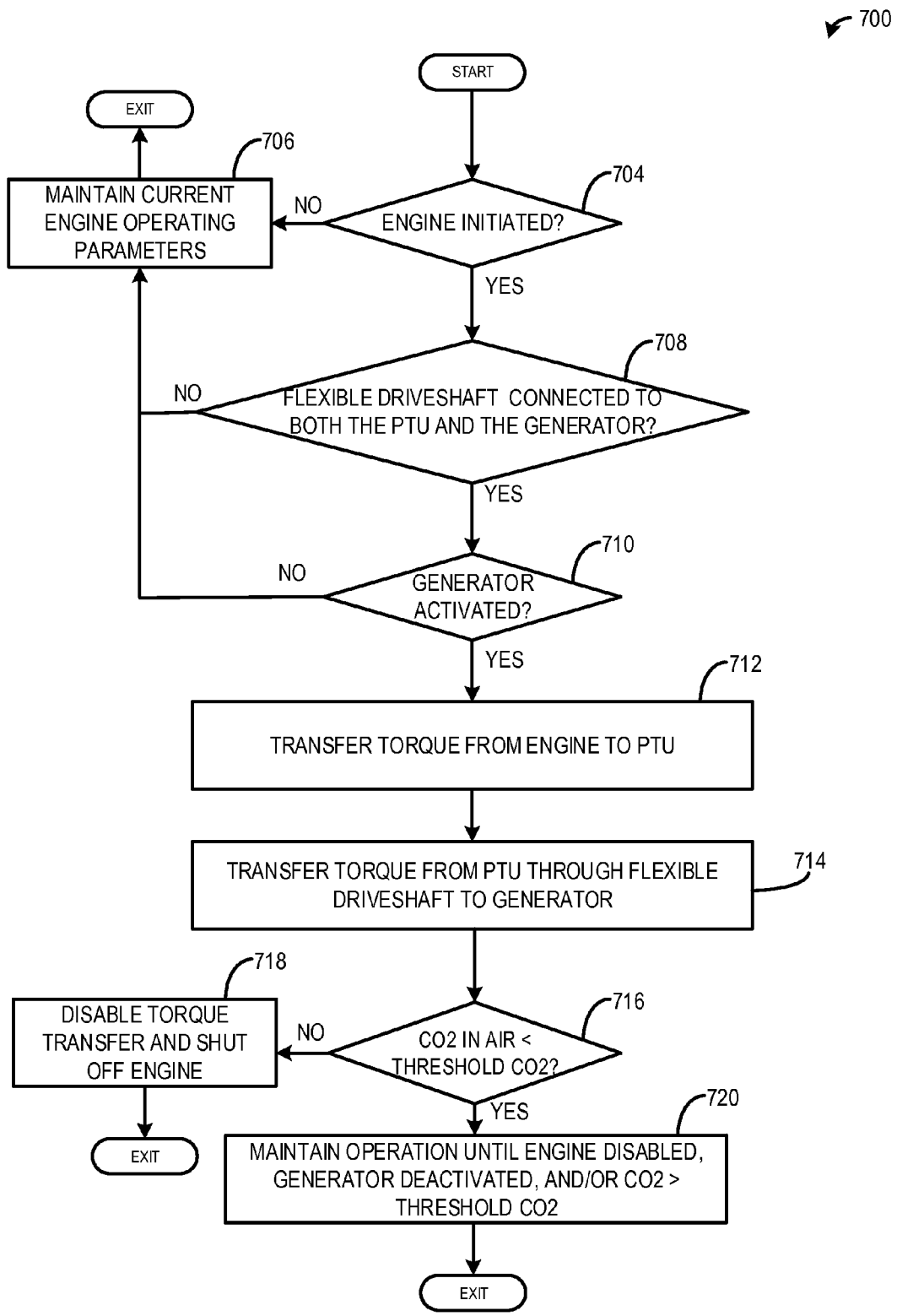
FIG. 7 depicts a method for operation of the PTU and the generator.
Figure 8:
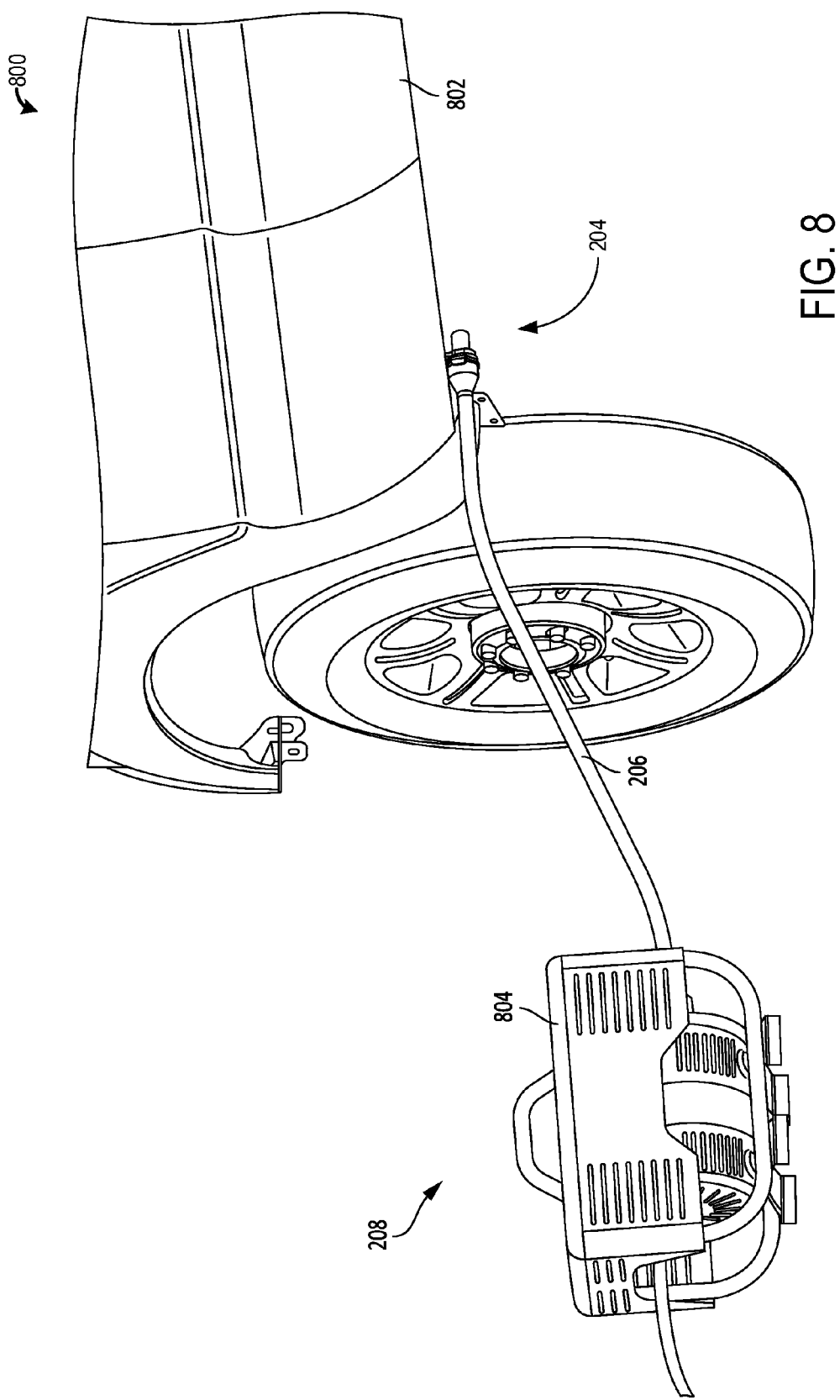
FIG. 8 depicts an operating vehicle supplying power to a generator via a flexible driveshaft and a PTU.

The following description relates to system and methods for operating a portable generator coupled to a power-transfer unit (PTU) via a flexible driveshaft. As one example, the flexible driveshaft and portable generator may be included as a kit that may be used with a vehicle. For example, the generator may be coupled to the PTU of the vehicle via the flexible driveshaft, as shown in FIG. 2. The PTU may transfer torque from an engine, such as the engine shown in FIG. 1, directly to the flexible driveshaft. FIG. 3 depicts an example of a generator capable of coupling to the PTU via a flexible driveshaft and then providing electricity to an ancillary electrical device on-board or off-board the vehicle. The generator may also come with a cover for use during inclement weather conditions, as shown in FIG. 8. The flexible driveshaft and generator may have complementary connectors for a secure connection that effectively transfer rotational power, while also allowing for quick and easy release, as shown in FIGS. 4-6. FIG. 7 shows a method for operating the PTU, flexible driveshaft, and the generator to transfer torque from the PTU to the generator.

Figure 1:
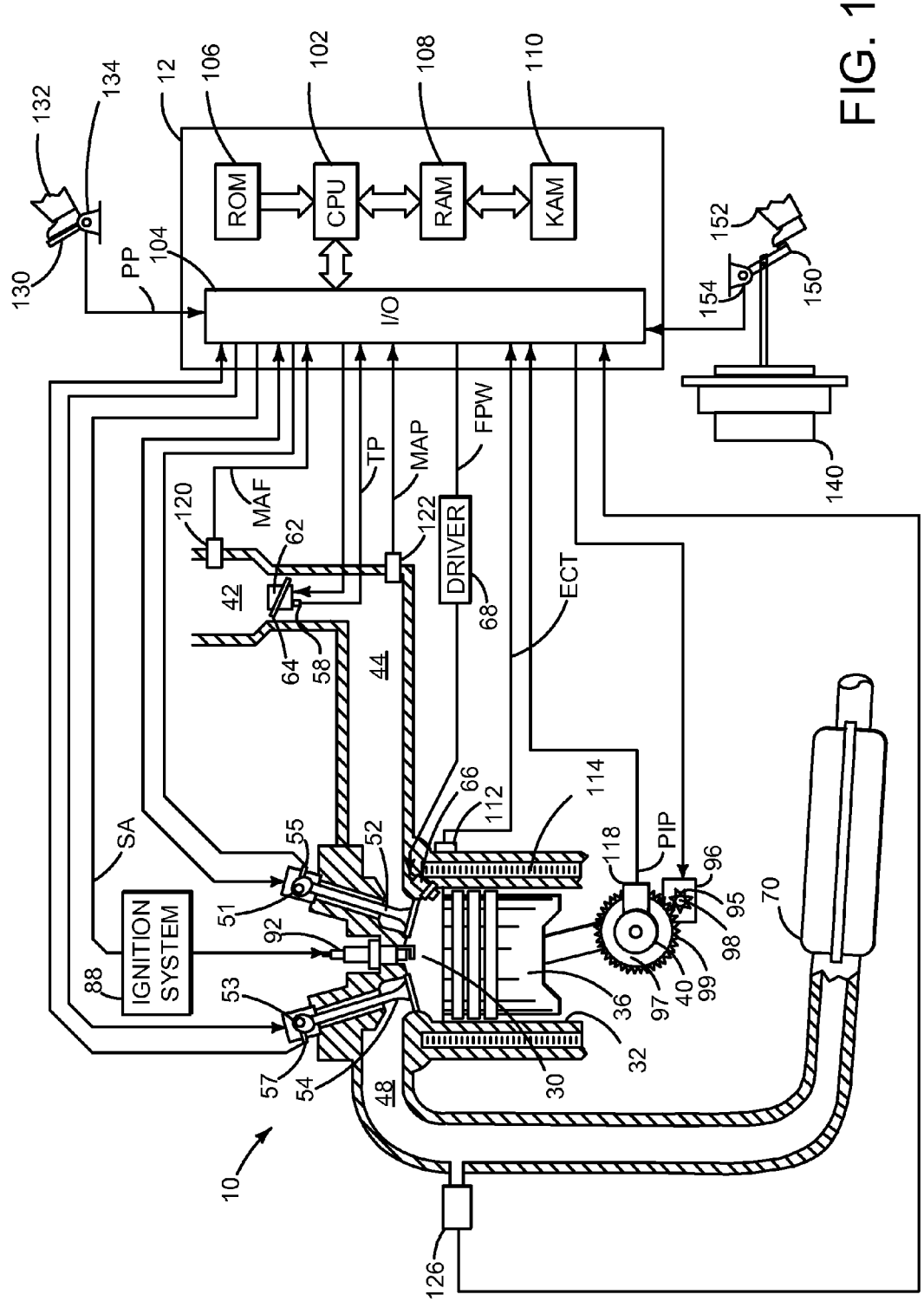
FIG. 1 depicts an engine including a single cylinder.

Referring to FIG. 1, internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. In another embodiment, the engine may not include a spark plug and utilize stratified combustion.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Now turning to FIG. 2, a block diagram of a system 200 including a vehicle 201, the vehicle 201 including the engine and crankshaft of FIG. 1, is shown. As such, components previously introduced in FIG. 1 are numbered similarly and not re-introduced here for reasons of brevity. FIG. 2 includes a kit comprising a generator including a complementary connector and flexible driveshaft comprising an outer sheath and an inner, rotatable and flexible inner shaft (also referred to herein as a mandrel), where a first end of the inner shaft is coupleable to the complementary connector of the generator and a second end of the inner shaft is coupleable to a complementary connector of a power take-off device of a vehicle. The first end includes a first mechanical coupler adapted to be directly and rotatably coupled with the complementary connector of the generator and the second end includes a second mechanical coupler adapted to be directly coupled to the complementary connector of the power take-off device (e.g., PTU).

The flexible driveshaft couples the generator to a power take off unit (PTU, also referred to herein as a power transfer unit). The PTU, generator, and flexible driveshaft may all include complementary connectors for rotatively coupling to one another. As discussed further below, the flexible driveshaft may include an outer sheath and a rotatable and a flexible mandrel (e.g., inner shaft), where a first end of the mandrel is coupleable to a complementary connector of the generator and a second end of the mandrel is coupleable to a complementary connector of a power take-off device of a vehicle.

System 200 may be powered by engine 10. In one example, engine 10 may be a gasoline engine. In an alternate example, other engine configurations may be employed, for example, a diesel engine. Engine 10 may be started with an engine starting system (not shown). Further, engine 10 may generate or adjust torque via a torque actuator (e.g., a fuel injector, throttle, etc.).

The crankshaft 40 transfers engine output torque to a torque converter 202 to drive either a transmission (not shown) or power take off unit (PTU) 204. Crankshaft 40 may be coupled to torque converter 202. The PTU 204 may be coupled to the torque converter 202 upstream of the transmission. Additionally or alternatively, PTU 204 and the transmission may both be coupled to torque converter 202 independent of one another. In this way, torque may be supplied to the PTU independent of an engaged gear (e.g., vehicle may be in park, reverse, neutral, drive, etc). This may be because a gear driving the PTU is coupled directly to the torque converter 202. For example, while in a park gear, a torque converter lock-up clutch may be fully engaged and therefore, the transmission may not receive torque despite an engine firing. However, while in the park gear, the torque converter 202 may transfer torque to the PTU 204, which in turn may be able to supply power to an ancillary vehicle accessory (e.g., generator 208). In this way, torque may be supplied to the PTU 204 in any gear. In other words, the PTU may power the generator 208 regardless of the vehicle 201 being stationary or in motion. Additionally or alternatively, the torque converter 202 may only supply torque to the PTU 204 when the generator 208 is activated and is connected to the PTU (e.g., generator is demanding power) via a flexible driveshaft 206. Furthermore, a vehicle may provide power to both the transmission and the PTU 204 simultaneously (e.g., vehicle may drive and power an ancillary vehicle accessory).

PTU 204 may transfer power to the generator 208 via complementary couplers 236 and 239 of a flexible driveshaft 206 being connected to complementary connectors 235 and 240 of the PTU 204 and the generator 208, respectively. In one example, complementary couplers 236 and 239 may be different in size and shape and complementary connectors 235 and 240 may also be different in size and shape such that complementary coupler 236 may only couple to complementary connector 235 and complementary coupler 239 may only plug into complementary connector 240. In this way, a first set of complementary couplers (e.g., connectors) may include complementary coupler 236 and complementary connector 235 and a second set of complementary couplers may include complementary coupler 239 and complementary connector 240. In this way, each coupler or connector of one set of complementary couplers mates with only the other coupler or connector of the same set of complementary couplers. In an alternative example, complementary couplers 236 and 239 may be a similar size and shape and complementary connectors 235 and 240 may be a similar size and shape such that the complementary couplers 236 and 239 may couple to both complementary connectors 235 and 240. Additionally or alternatively, complementary connector 235 is an output complementary connector of the PTU 204. Complementary connector 240 is an input complementary connector for the generator 208.

As depicted, the flexible driveshaft may be bent/twisted in various directions to enable a variety of connection positions between the generator 208 and the PTU 204 (e.g., the generator may be on a driver or passenger side of the vehicle, in a truck bed of the vehicle, etc.). In one example, if a customer loses power to their home (e.g., blackout/power outage), then it may be preferred to utilize the PTU on their vehicle to power a generator in an area open to the atmosphere. In this way, the generator may be placed on an uneven or slanted surface with the vehicle (e.g., a sloping driveway) due to the flexibility of the driveshaft when compared to other inflexible driveshafts (e.g., driveshafts that are rigid and linear during operation). By utilizing a flexible driveshaft 206, the generator 208 may be positioned on uneven surfaces at a variety of levels relative to a vertical level of the PTU 204 (e.g., the vertical level may be relative to a ground on which the vehicle sits). In this way, a consumer may quickly connect a flexible driveshaft 206 to both a generator 208 and a PTU 204 without seeking a flat, level surface and/or a surface at a same vertical level as an output of the PTU. The coupling and structure of the flexible driveshaft 206 will be described in more detail with respect to FIG. 4.

The generator 208 may be relatively small compared to other generators (e.g., weighs less than approximately 50 lbs and is portable) such that a consumer may carry the generator without assistance (e.g., two person lift is not needed). The generator may provide power to an external electrical source(s) 212 (e.g., refrigerator, light, etc) via cord 210 connecting an A/C plug 246 into an A/C plug connector 245 of the generator 208. It will be appreciated by someone skilled in the art that other suitable devices may be powered by the generator. In this way, a consumer may preserve a comfort of living during a blackout.

As one example, a vehicle vendor may provide a kit comprising the generator 208 and flexible driveshaft 206 for a consumer to purchase along with or separately from a vehicle with a PTU resembling the PTU 204 described above.

Now turning to FIG. 3, an embodiment of the generator of FIG. 2 is shown. As such, components previously introduced in FIGS. 1 and 2 are numbered similarly and not re-introduced here for reasons of brevity. A map of axes has been provided in FIG. 3.

Generator 208 comprises a frame 302. Frame 302 may comprise aluminum, titanium, iron, brass, or other suitable materials. The frame 302 may be rigid and treated to be impervious to rust. In some embodiments, additionally or alternatively, the frame 302 may be separated from the generator body 300. In this way, the generator 208 may be more compact for transportation or other purposes.

The frame 302 extends farther in the x, y, and z directions than a generator body 300. Said another way, the frame 302 completely surrounds an exterior of the generator body 300. In this way, the frame 302 may support the generator body 300 and protect it from harmful contact with outside objects without physically touching any portion of the generator body 300. The frame 302 resembles a saddle with a tube 304 connecting the highest points of a center of the saddle along the y axis. The tube 304, which includes a handle 305, may span across a distance in the y direction greater than a distance of the generator body 300 in the y direction. The tube 304 forms the handle 305. The tube 304 is physically coupled to side tube portions 308A and 308B on sides 310A and 310B of the frame 302, respectively. In other words, the tube 304 is longer than the generator body 300 in the y direction. The tube 304 is disposed vertically above, with respect to the z axis, the generator body 300 such that the tube 304 and generator body 300 do not come in contact with one another. Furthermore, the handle 305 may be in a form of a protrusion of tube 304, along a center portion of tube 304 and above the generator body 300. That is to say, tube 304 is not linear at a center portion of tube 304 and forms the handle 305. Said another way, the handle 305 divides the tube 304 into two equal parts such that the handle 305 is located in the middle of the tube 304.

A first end of a connecting plate 306 is physically coupled to a first base of the handle 305 as the tube 304 begins to incline away from the generator body 300. A second end of the connecting plate 306 is physically coupled to a second, opposite base of the handle 305 as the tube 304 begins to curve in a direction parallel to the generator body 300 in the y direction. The connecting plate 306 is physically coupled to at least a portion of a top of tube 304. The connecting plate 306 will be described in further detail below. The connecting plate 306 comprises two holes corresponding to a circumference of the tube 304 such that the tube 304 traverses through both holes as the tube 304 forms the handle 305, as depicted. In this way, the connecting plate 306 circumferentially surrounds at least portions of the tube 304 where the handle 305 originates.

The side tube portions 308A and 308B of frame 302 traverse in the x direction in a linear fashion for at least a portion of the generator body 300. The side tube portions 308A and 308B begin to curve downward to a bottom of the generator 300 in the z direction. The frame 302 curves linearly downward on both ends of the side tube portions 308A and 308B from both sides 310A and 308B toward the bottom of the generator body (e.g., legs 312A and 312B) for at least a portion of the height of the generator body 300 in the z direction. Sides 310A and 310B may be substantially identical. Sides 310A and 310B of the frame 302 begin to curl (e.g., bend) towards each other in the y direction at the bottom of the generator body 300 and are physically coupled via legs 312A and 312B. Legs 312A and 312B may be substantially identical.

Legs 312A and 312B are also coupled to a top surface of generator supports 314A and 314B. Generator supports 314A and 314B extend across the width of the generator body 300 in the x direction from leg 312A to leg 312B and couple to the bottom of legs 312A and 312B perpendicularly. The generator supports 314A and 314B traverse farther in length in the x direction than the generator body 300 (e.g., the frame 302 is wider in the x direction than the generator body 300). The generator support 314A is closer to the side 310A while generator support 314B is closer to the side 310B. Feet (e.g., feet 316A and 316B) are coupled to the bottom of legs 314A and 314B, respectively. Feet 316A and 316B may comprise an impact absorbent material such that the feet 316A and 316B mitigate an impact received by the generator 208 from a surface. Feet 316A and 316B are substantially identical to each other and have flat pedestal like bottoms, as shown. Feet 316A are a pair and feet 316B are a separate pair. Feet 316A are closer to the side 310A and feet 316B are closer to the side 310B on the frame 302. In some embodiments, one pair of feet, either 316A or 316B, may be wheels such that a consumer may roll the generator when an end of the generator opposite the feet is lifted. By having a pair of wheels and a pair of feet, the generator 208 may be smoothly rolled around while also remaining stationary while being set down.

The generator body 300 may sit atop the generator supports 314A and 314B via generator legs 318A and 318B. Generator legs 318A and 318B may be substantially identical and paired (e.g., generator legs 318A comprise a pair). Generator legs 318A are closer to the side 310A while generator legs 318B are closer to the side 310B. Generator legs 318A and 318B may be substantially identical. The generator body comprises vents 350 along a bottom half (e.g., half a circumference) of the generator directed towards sides 310A and 310B, respectively. A length of the vents 350 may be at least a portion of the radius of an end the generator body 300 (e.g., the end facing side 310A). For example, the vents 350 may be spaced away from an exterior diameter of the generator body 300 and extend inward toward a centerline of the generator body 300. Additionally, side vents 352 are located along bottom sides of the generator body and may be closer to legs 312A and 312B than a top of the generator body 300. Side vents 352 span a bottom half (e.g., half a circumference) of an exterior surface of the generator body 300. Finally, ridges 356 are also located along a top side of the generator body 300 directed towards the tube 304 and handle 305.

As described above, generator 208 may receive torque from a PTU via a flexible driveshaft 206. The flexible crankshaft 206 connects to the generator body 302 via an input complementary connector 240 of the generator on a face of the generator body nearest the side 310A. The flexible crankshaft 206 connects to complementary connector 240 via a flexible drive cable outlet 322. The flexible drive cable outlet 322 comprises a quick release tab 324. The flexible drive cable outlet 322 expands in exterior diameter from a base of the driveshaft 206 to the tab 324. The flexible drive cable outlet 322 may include a first complementary connector coupleable to a second complementary connector of the generator (e.g., complementary connectors 239 and 240, respectively, as shown in FIG. 2). Quick release tab 324 may disconnect the flexible drive cable outlet 322 from the complementary connector 240 upon being actuated toward the generator body 302. However, the flexible drive cable outlet 322 may not disconnect from the complementary connector 240 if the rotatory component(s) located within the flexible driveshaft 206 are moving. The quick release tab 324 may make an audible noise upon connection of the flexible drive cable outlet 322 and the complementary connector 240 such that a consumer may hear when the connection is complete. Furthermore, the quick release tab 324 may lock to a portion of the complementary connector 240 such that the flexible drive cable outlet 322 may only be disconnected from the complementary connector 240 when the quick release tab 324 is actuated toward the generator body 300. In this way, the consumer may know the flexible drive cable outlet 322 is connected to the complementary connector 240 without light. In may be appreciated by someone skilled in the art that the flexible drive cable outlet and/or the quick release tab may comprise a form of indicia to assist a consumer with recognizing which end of the flexible drive shaft to connect to the input complementary connector 240.

Although, not depicted, flexible drive shaft 206 comprises a flexible drive cable inlet, along with a quick release tab, to be coupled to an output complementary connector of a PTU (e.g., PTU 204, complementary coupler 236, and complementary connector 235 as shown in FIG. 2). In one example, the flexible drive cable inlet may be a mechanical coupler adapted to couple to the output complementary connector of the PTU. Although the flexible drive shaft 206 may connect to complementary connectors 235 and 240 in a similar manner, the ends with which the flexible drive shaft connects to the complementary connectors may be specific. For example, the flexible drive shaft may comprise a first end adapted to be directly and rotatably coupled to an input complementary connector of the generator and not the output complementary connector of the PTU. Therefore, the flexible drive cable may further comprise a second end adapted to be directly and rotatably coupled with the output complementary connector of the PTU. Additionally or alternatively, the quick release tab of the flexible drive inlet may comprise a different indicia than the quick release tab 324 of the flexible drive outlet 322. In this way, a consumer may be able to decipher which end of the flexible driveshaft to couple to either a generator or PTU without light. In some embodiments, both ends of the flexible driveshaft 206 may be able to couple to the same complementary connector. In this way, a consumer may attach either end of the flexible driveshaft to either the complementary connector 235 or the complementary connector 240. The flexible drive cable inlet will be described in greater detail with respect to FIGS. 5 and 6.

On an exterior face of the generator nearest the side 310B, a complementary connector outlet 245 is used to provide power from the generator 208 to an auxiliary device. The complementary outlet 245 is shaped to receive and mate with an AC plug 326 in order to transfer electric power to the auxiliary object via AC plug extension 328.

A cover 804, as seen in FIG. 8, described in further detail below, may be provided along with the kit including the generator and flexible driveshaft to enable a consumer to protect the generator body 300 from severe weather conditions (e.g., rain, snow, etc) for outdoor use by encasing the frame 302 of the generator. The cover 804 may comprise of an anti-rust material (e.g., polyurethane). It will be appreciated by someone skilled in the art that the cover may comprise of any suitable material. The cover 804 may be a similar, slightly larger shape than the frame 302 such that the cover 804 may fit on and around the outside of the frame 302. In other words, the cover 804 may be slightly larger than the frame 302 such that the cover 804 is physically coupled to the outside of the frame when the cover 804 is placed on the generator 208. On sides 310A and 310B, the cover 804 may not extend beyond the tops of the complementary connectors 240 or 245 in the z direction, respectively. In this way, the cover 804 may be installed while still being able to connect/disconnect the flexible driveshaft 206 and the AC plug extension 328. On the sides of the generator body facing the legs 312A and 312B, the shield extends to a height equal to the beginning of legs 318A and 318B. An elliptical hole is machined into the cover 804 such that the hole corresponds to a shape of the connecting plate 306. In this way, the handle may extend through the cover 804 upon placing the cover 804 on the frame 302. Furthermore, the connecting plate 306 is level in height with the cover 804 when the cover 804 is installed.

It will be appreciated by someone skilled in the art that a different generator may be used as long as the flexible driveshaft may be able to couple to the generator. In some embodiments, additionally or alternatively, an adapter may be included with the flexible driveshaft such that the flexible driveshaft may be able to couple to a myriad generators having connectors compatible with and configured to couple to the adapter.

Now turning to FIG. 4, a cross-section of the flexible drive cable outlet of the flexible driveshaft connected to the complementary connector of the generator presented in FIG. 3 is shown. As such, components previously introduced in FIGS. 1, 2, and 3 are numbered similarly and not re-introduced here for reasons of brevity. As depicted, the flexible drive cable outlet 322 and the complementary connector 240 lie in front of frame 302, which comprises leg 312A. The leg 312B and a side of frame 302 nearest leg 312B have been omitted for issues of clarity.

Flexible driveshaft 206 comprises three layers. An outer sheath 402, an internal drive cable liner 404, and a mandrel (also referred to as an inner shaft) 406. The outer sheath 402 circumferentially surrounds the internal drive cable liner 404 and at least a portion of the mandrel 406 until the mandrel 406 reaches the flexible drive cable outlet 322. Additionally, the internal drive cable liner surrounds the mandrel 406 for a portion equal to the portion of the mandrel 406 covered by the outer sheath 402, as shown in FIG. 4. In this way, the outer sheath 402, the internal drive cable liner 404, and the mandrel 406 are all concentric with one another. The outer sheath 402 is stationary (e.g., non-rotatable), in that no part of the outer sheath 402 rotates and/or spins relative to the other components of the flexible driveshaft 206 (e.g., the liner 404 and the mandrel 406). The outer sheath 402 may serve as a durable layer, protecting a consumer from spinning components located within the flexible driveshaft 206. As one example, the outer sheath comprises anisotropic fibers that are perpendicular to one another (e.g., crisscross). In some embodiments, the fibers may be parallel to one another. The outer sheath may comprise of one or more layers of said fibers. It will be appreciated by someone skilled in the art that the outer sheath 402 may comprise of a material suitable for both being flexible and housing rotary components.

As described above, the internal drive cable liner 404 is completely surrounded by the outer sheath 402 along an entire length of the internal drive cable liner 404. The internal drive cable liner 404 at least partially houses the mandrel 406. Therefore, an outer circumference of the mandrel 406 is surrounded by and attached to an internal drive cable liner 404, and an outer circumference of the internal drive cable liner 404 is surrounded by the outer sheath 402. The internal drive cable liner 404 comprises a single, uniform material capable of being physically adjoined to the mandrel 406 without both inhibiting the rotation of the mandrel 406 and being degraded by the mandrel (e.g., so the mandrel 406 does not tear the internal drive cable liner 404). In this way, the outer sheath 402 is stationary relative to rotation of the mandrel 406 and the outer sheath 402 and mandrel 406 are concentric with one another. The outer sheath 402 is stationary and is not physically adjoined with the internal drive cable liner 404 and mandrel 406 such that the mandrel 406 and adjoined internal drive cable liner 404 may rotate within the outer sheath 402. There may be some clearance between the outer sheath 402 and the internal drive cable liner 404 to allow the mandrel 402 and the liner 404 to rotate easily without contacting the outer sheath 402. In this way, the flexibility of each of an outer sheath 402, an internal drive cable liner 404, and mandrel 406 may be substantially equal. An outer circumference of the mandrel is circumferentially surrounded by the internal drive cable liner 404, and an outer circumference of the internal drive cable liner 404 is circumferentially surrounded by the outer sheath 402. In this way, the outer sheath 402 is stationary relative to rotation of the mandrel 406 and the outer sheath 402 and mandrel 406 are concentric with one another.

Flexible drive cable outlet 322 houses a shorter portion of mandrel 406 compared to the internal drive cable liner 404. The flexible drive cable outlet 322 circumferentially surrounds an exterior of an end portion of mandrel 406. However, the flexible drive cable outlet 322 is not physically coupled to the mandrel 406, whereas the internal drive cable liner 404 is physically coupled to the mandrel 406. The end portion of the mandrel 406 that is surrounded by the drive cable outlet 322 is not surrounded by the drive cable liner 404 and the outer sheath 402. A space 408 exists around an exterior of the end portion of the mandrel 406 and separates an outer surface the mandrel 406 from an inner surface of the flexible drive cable outlet 322. The flexible drive cable outlet 322 comprises a plastic or metal material. It will be appreciated by someone skilled in the art that the flexible drive cable outlet may comprise of other suitable materials.

As described above, the flexible drive cable outlet 322 comprises a quick release tab 324 which may be used to more easily and quickly disconnect the flexible driveshaft 206 from the complementary connector 240 of the generator upon actuating the quick release tab 324 toward the generator body 302. The quick release tab 324 extends outwardly from an outer surface of the flexible drive cable outlet 322. The quick release tab 324 is in a locked position when the first end of the mandrel is mechanically coupled to the first complementary connector of the generator such that torque may be transferred from the mandrel to the generator. The quick release tab 324 may produce an audible sound, such as a click, upon completing a connection (e.g., the quick release tab enters a locked position) between the flexible driveshaft 208 and the complementary connector 240, as described above. The quick release tab 324 in the locked position may prevent disconnection of the flexible drive shaft from the generator. As shown in FIG. 4, the quick release tab 324 extends outwardly from one side of the flexible drive cable outlet 322 perpendicular to the complementary connector 240 of the generator 208 (e.g., perpendicular to a central axis of the complementary connector 240).

The generator includes an outer mating fixture 410 surrounding the complementary connector 240 of the generator. The outer mating fixture 410 extends outward from an exterior surface of the generator. An inner surface of the flexible drive cable outlet 322 fits around an exterior surface of the outer mating fixture 410. As one example, the diameter of the inner surface of the flexible drive cable outlet 322 may be slightly larger than the diameter of the outer exterior surface of the outer mating fixture 410 such that the flexible drive cable outlet 322 fits snugly around the outer mating fixture 410. Additionally, the flexible drive cable outlet 322 may be directly coupled to the outer sheath 402 at a position of the flexible driveshaft 206 before the outer mating fixture 410 and complementary connector 240. Further, the flexible drive cable outlet 322 is spaced away from and surrounds an outer circumference of the first end of the mandrel 406.

The complementary connector 240 of the generator extends at least partially outside the generator body outer mating fixture 410. As described above, the complementary connector 240 may be designed such that it can receive either only one end of the flexible driveshaft 206 or both ends of the flexible crankshaft 206. In the case of receiving only one end, an indicia may be used to help a consumer identify, which end couples to either a PTU or a generator (e.g., generator 208).

The portion of the mandrel 406 protruding into the flexible cable drive outlet 322 is inflexible in order to allow the mandrel 406 to be physically coupled to the complementary connector 240, which is also inflexible. However, as described above, the portion of the mandrel 406 housed by the internal drive cable liner 404 are flexible.

As depicted, the complementary connector 240 receives a thinner, first end of mandrel 406 which includes a first mechanical coupler to physically couple to the complementary connector 240 when fully connected (e.g., when the quick release tab 324 makes an audible sound or mating connection). The mandrel 406 is rotatively coupled to the complementary connector 240. The mandrel 406 rotates via torque received from the PTU and in turn also rotates the complementary connector 240. Said another way, the mandrel 406 transfers torque directly to the complementary connector 240. As the mandrel 406 and complementary connector 240 are simultaneously rotating, the complementary connector 240 rotates an alternator of the generator 208. The alternator then also rotates at a speed substantially equal to the rotation of both the mandrel 406 and complementary connector 240. The alternator is able to convert the kinetic, rotational energy (e.g., torque) into electric energy for an external electrical source (e.g., external electrical source 212) connected to an A/C plug connector (e.g., A/C plug connector 245) of the generator 208. An output complementary connector (e.g., A/C plug connector 245) is coupled to a power output cable, the power output cable including a cable coupling coupleable to a power input of an electrical device. In this way, the alternator converts torque to electricity to be transferred out of the generator 208 through a complementary connector (e.g., complementary connector 245) to an AC plug. Therefore, the complementary connector 240 is a rotating part capable of rotating at least a portion of the alternator.

A second connecting point between the generator 208 and flexible driveshaft 206 exists. The second connecting point includes outer mating fixture 410 being physically coupled to an interior surface of the flexible drive cable outlet 322. The quick release tab 324 is physically coupled to and locked to one of the outer mating fixture 410. In this way, the flexible driveshaft 206 may not be uncoupled from the generator 208 without actuating the quick release tab 324. By doing this, a consumer is not exposed to moving parts of the flexible driveshaft 206 during its operation. As shown in FIG. 4, the outer mating fixture 410 extends along a portion of the flexible drive cable outlet 322 beyond an end of the mandrel 406 and short of an end of the complementary connector 240.

FIG. 5 depicts a coupling between the flexible driveshaft and a PTU of a vehicle. FIG. 5 includes system 500 comprising the flexible drive shaft 206 being coupled to a PTU (e.g., PTU 204 shown in FIG. 2) via a PTU driveshaft 508 (e.g., output shaft of PTU). A cross-section of the coupling shown in FIG. 5 is depicted in FIG. 6.

The flexible driveshaft 206 comprises a flexible drive cable inlet 502 used to couple the flexible driveshaft 206 to the PTU. The flexible drive cable inlet 502 includes a quick clip disconnect 504. The quick clip disconnect 504 allows a consumer to easily disconnect the flexible driveshaft from the PTU via actuating the quick clip disconnect 504.

A mounting bracket 506 assists in coupling the flexible driveshaft 206 to the PTU. The mounting bracket couples to both the flexible drive cable inlet 502 and quick clip disconnect 504 and guides the inner shaft (e.g., mandrel 406) of the flexible driveshaft 206 to directly couple to an inflexible driveshaft 508 of the PTU. The coupling between the inner shaft (of the flexible drive cable) and the PTU driveshaft 508 will be discussed in more detail with respect to FIG. 6.

The mounting bracket 506 comprises a hole. The hole has a circumference corresponding to a circumference of the PTU driveshaft 508 such that the PTU driveshaft 508 extends through the hole without physically touching any portion of the hole and/or the mounting bracket 506. In this way, the PTU driveshaft 508 may rotate without rotating the mounting bracket 506 or being hindered by the mounting bracket 506.

In some embodiments, the flexible drive cable inlet 502 and quick clip disconnect 504 may be machined specifically to mechanically couple to the mounting bracket 506 and the PTU driveshaft 508 because the PTU driveshaft 508 includes the complementary connector 235 which mates with the flexible drive cable inlet 502. The quick clip disconnect 504 may comprise an indicia that is different from the indicia on the quick release tab 324. Additionally or alternatively, the quick clip disconnect 504 may also make an audible click when properly coupled to the mounting bracket 506.

In some embodiments, the flexible drive cable inlet 502 and quick clip disconnect 504 may be substantially similar in structure to the flexible drive cable outlet 322 and quick release tab 504. In this way, both ends of the flexible driveshaft, the inlet 502 and the outlet 322 may couple to both the driveshaft from the PTU and a complementary connector (e.g., complementary connector 240) of a generator. Furthermore, both the quick clip disconnect 504 and the quick release tab 324 may couple to both the mounting bracket 506 and an outer mating fixture (e.g., outer mating fixture 410) of the generator.

An advantage of the flexible driveshaft includes a flexible outer sheath and a tab and clip at both ends of the flexible driveshaft. The tab and clip lock into place upon completing a connection between the flexible driveshaft a complementary connector of either a generator or a PTU. By combining both the locking function of the tab and clip and the flexible outer sheath, a consumer is not exposed to moving parts within the flexible driveshaft during its operation. Additionally, by locking the tabs and clips into place, the flexible driveshaft does not come loose upon pulling, twisting, and/or stretching motions. The combination of all these features provides a consumer with a safe environment to operate the PTU-flexible driveshaft-generator linkage.

Turning now to FIG. 6, a cross-section of the coupling between the flexible drive cable inlet of the flexible driveshaft to both a mounting bracket and PTU driveshaft is shown.

The flexible driveshaft 206 comprises both the flexible outer sheath 402 and inner shaft (e.g., mandrel 406), as described above. As depicted, an internal drive cable liner (e.g., internal drive cable liner 404) has been omitted. However, the flexible driveshaft 206 may still comprise an internal drive cable liner on an end coupled to the PTU. The internal drive cable liner may end at the beginning of the flexible drive cable inlet 502.

The mandrel 406 is physically coupled to the PTU driveshaft 508 via a flat end of the mandrel pressing against a flat interior portion of the PTU driveshaft 508. As depicted, an end of the mandrel physically coupled to the PTU driveshaft 508 is smaller in diameter than portions of the mandrel 406 within the confines of the outer sheath 402. The mandrel 406 couples to the PTU driveshaft 508 within an interior of the flexible drive cable inlet 502.

The flexible drive cable inlet 502 is physically and directly coupled to and around a portion of the mounting bracket 506 when the mandrel 406 is coupled to the PTU driveshaft 508. In this way, two connection points exist when the flexible driveshaft 206 is coupled to the PTU, one between the mandrel 406 and PTU driveshaft 508 and a second between the flexible drive cable inlet 502 and the mounting bracket 506. Additionally, the quick clip disconnect 504 is coupled to the mounting bracket 506 when the mandrel 406 is coupled to the PTU driveshaft 508. More specifically, a tab of the quick clip disconnect 504 engages with a notch in the mounting bracket 506 when in the locked position, thereby securely coupling the flexible driveshaft to the PTU.

As depicted, the mandrel 406 and the PTU driveshaft 508 are coupled to one another without physically touching an interior surface of the outer sheath 402, the mounting bracket 506, the quick clip disconnect 504, and the flexible drive cable inlet 502. By doing this, the mandrel and PTU may rotate freely.

Additionally or alternatively, when the flexible driveshaft 206 is disconnected from the PTU driveshaft 508, the PTU driveshaft 508 protrudes through the mounting bracket 506 toward a front left tire of the vehicle. Therefore, a weather shield corresponding to a shape of the PTU driveshaft 508 may be used to keep unwanted debris out of the PTU driveshaft 508 when the flexible driveshaft 206 is not coupled to the PTU.

In an example situation, to power an external electric source (EES) during a power outage, a consumer starts their vehicle, at which point, the PTU is not spinning. A flexible driveshaft is then coupled to both a PTU and a generator via corresponding complementary connectors. Upon coupling the flexible driveshaft to the PTU and generator, both the quick release tab and the quick clip disconnect make an audible noise and lock into place in order to prevent the flexible driveshaft from disconnecting from both the generator and the PTU, respectively. The consumer then connects the EES to an AC outlet of the generator. However, the EES does not yet receive power until the generator is activated and the PTU begins to rotate. The consumer activates the generator. In doing so, an electrical demand is requested at the generator end of the flexible driveshaft. The PTU driveshaft begins to rotate a mandrel within the flexible driveshaft. As the PTU driveshaft and mandrel rotate, the mandrel begins to actuate a complementary connector on the generator, which in turn actuates an alternator. As the alternator spins, it creates electricity to flow to the EES.

A method for the operation of transferring torque from the engine to the PTU and through the flexible driveshaft to the generator will be discussed below with respect to FIG. 7.

FIG. 7 depicts exemplary method 700 for operation of a PTU in order to power a generator. A generator may receive torque when a flexible driveshaft is coupled to both a PTU and the generator completely, an engine is firing and transferring torque to the PTU, and the PTU is transferring torque through the flexible driveshaft to the generator. The generator may then supply electricity to an external object with a complementary connector capable of housing an AC plug.

FIG. 7 may be described with reference to components described above, such as engine 10, PTU 204, complementary connectors 235, 240, and 245, flexible driveshaft 206, generator 208, mandrel 406, outer sheath 402, and internal drive cable liner 404.

At 704, the method 700 includes determining if an engine is activated. This may include determining if an ignition has been actuated by the consumer (e.g., ignition button pressed or ignition key slot turned) and/or determining if an engine speed is greater than 0. If the engine is not firing (e.g., not activated), then the method 700 may proceed to 706 to maintain current engine operation parameters and not transfer torque from the engine to the PTU.

If the engine is initiated, the method 700 continues to 708 to determine if the flexible driveshaft is completely connected to both the PTU and the generator via detecting if a mandrel within the flexible driveshaft is physically coupled to both complementary connectors 235 and 240 of the PTU and the generator, respectively. The completely connected flexible driveshaft may also include a quick release tab being in a locked position. When the quick release tab is in the locked position, the flexible driveshaft may not be disconnected from either the PTU or generator via a pulling, twisting, or other similar motions. In this way, the flexible driveshaft may only be disconnected from the PTU or generator via actuating the quick release tab. If the flexible driveshaft is not completely connected to one or more of the generator and PTU, then the method 700 proceeds to 706 to maintain current engine operating parameters and does not transfer torque to the PTU. Completely connected is when a connector on the driveshaft is mated/mechanically coupled with the complementary connector of either the generator or the PTU.

If the flexible driveshaft is completely coupled to both complementary connectors of the PTU and generator, then the method 700 may proceed to 710 to determine if the generator is activated and ready to receive torque. An activated generator may include a consumer actuating a switch to activate the generator and allow it to assume a position capable of receiving torque from the flexible driveshaft so that the alternator may actuate and produce electrical current. If the generator is not activated then the method 700 proceeds to 706 and the engine does not transfer torque to the PTU while maintaining current engine operation.

If the generator is activated and ready to receive torque from the flexible driveshaft then the method 700 may proceed to 712 to transfer torque from the engine to the PTU independent of a current gear (e.g., park, reverse, neutral, and drive). This includes firing the engine which in turns move a piston to bottom dead center to top dead center. The piston in turn actuates a crankshaft (e.g., crankshaft 40) which generates torque. In this way, thermal energy produced by the combustion of the engine is converted into rotational, kinetic energy transferred to the PTU, as described above with respect to FIG. 2.

At 714, the method 700 includes transferring torque from the PTU through the flexible driveshaft to the generator. This includes rotating a PTU driveshaft to spin a mandrel located within the flexible driveshaft via torque from the PTU. As the mandrel receives the torque from the PTU through a complementary connector of the PTU (e.g., complementary coupling 235), it is then able to rotate and transfer power from the PTU to the generator by rotating a first complementary connector of the generator (e.g., complementary connector 240). Additionally or alternatively, the mandrel may bend and twist while rotating such that the flexible driveshaft is no longer linear. The mandrel is protected (e.g., shielded) from elements outside of the flexible driveshaft via an inner drive cable liner, an outer sheath, a flexible drive cable inlet, and flexible drive cable outlet. Additionally, as mentioned above, the mandrel does not rotate (e.g., receive torque) until the flexible driveshaft is completely connected to both the PTU and the generator. In this way, a consumer may not be exposed to moving parts.

As the generator receives torque, an alternator converts the torque into electricity to be provided to an external object (e.g., lamp, refrigerator, etc.). The generator provides electricity to the external object via connecting an AC plug of the external object to a second complementary connector of the generator (e.g., complementary connector 245).

At 716, the method 700 includes determining if a concentration of CO2 in ambient air is less than a threshold CO2 concentration to ensure a consumer safety. If a consumer operates their vehicle and generator in a poorly ventilated area, then CO2 levels may exceed a threshold CO2 concentration (e.g., 1%). If the CO2 concentration is not below the threshold CO2 concentration, then the method 700 may proceed to 718 and disable torque transfer to the PTU by shutting off the engine.

At 720, the method 700 includes maintaining current engine operation until the engine is manually shut-off by a consumer, the generator is deactivated by a consumer, and/or the CO2 concentration is greater than a threshold CO2 concentration. For the case of the generator being deactivated by a consumer, the engine may continue to operate where torque is no longer being transferred through the flexible driveshaft. In this way, the generator is no longer able to provide electricity to the external object.

Returning to FIG. 8, which depicts a system 800 of a vehicle PTU 204 powering a generator 208 via a flexible driveshaft 206. As depicted, the generator and the PTU 204 are at unequal heights. Also as depicted, the complementary connector of the PTU 204 is located on a driver side undercarriage of a vehicle 802 where the connector is out of plain sight and visible upon examining the undercarriage of the vehicle 802 near the driver door. Furthermore, the generator 208 is positioned closer to a front end of the vehicle than the PTU 204. The flexible driveshaft 206 is transferring power (e.g., torque) from the PTU 204 to the generator 208 while being bent and/or twisted. As depicted, a cover 804 is located on the generator 208 to protect the generator 208 from weather elements.

FIG. 8 further depicts a system 800 for a vehicle 802 comprising a vehicle including a power take-off unit (PTU) 204 including an output complementary connector (e.g., output complementary connector 235), a portable generator 208 including an input complementary connector (e.g., input complementary connector 236), and a flexible driveshaft 206 comprising an outer sheath (e.g., outer sheath 402) and an inner, rotatable mandrel (e.g., mandrel 406), the mandrel including a first end with a first coupler adapted to couple to the input complementary connector and a second end with a second coupler adapted to couple to the output complementary connector of the PTU.

In this way, a vehicle may provide torque to a PTU in order to power a generator via flexible driveshaft. By doing this, a greater population of consumers may power their homes in the case of a power outage and/or more easily operate auxiliary electrical devices while traveling. Furthermore, the construction of the flexible driveshaft enables consumers to position the generator in a myriad of positions relative to the PTU while continuously transferring rotative power from the PTU to the generator.

The technical effect of powering a generator (which may in turn power an auxiliary electrical device) in a plurality of positions via a PTU of a vehicle is achieved with a kit comprising a flexible driveshaft and a compact, lightweight compressor. This kit may allow a consumer to provide power to an external electrical device (e.g., off-board the vehicle) in the event of a power outage. The kit may also be used for situations outside the event of a power outage, in which the consumer may be in a location without accessible electricity (e.g., forest, worksite, etc.). In this way, the consumer may provide power to an ancillary vehicle accessory anywhere the vehicle may traverse.

The advantages presented by the flexible driveshaft enable a consumer to readily power a generator via a flexible driveshaft connected to a PTU without keeping the PTU driveshaft and flexible driveshaft level. In other words, the generator may be placed at a height different than the height of the PTU.

Another advantage presented by the flexible driveshaft includes the quick release tab and the quick clip disconnect, both of which lock into place and subsequently provide an audible sound to notify a consumer when the flexible driveshaft is completely connected to the generator and PTU. By locking into place, the flexible driveshaft does not come loose without actuation of either the quick release tab and/or the quick clip disconnect. In this way, a consumer is not exposed to moving parts within the flexible driveshaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A kit, comprising:
a generator including a complementary connector; and
a flexible driveshaft comprising an outer sheath and a rotatable and flexible inner shaft, where a first end of the inner shaft is coupleable to the complementary connector of the generator and a second end of the inner shaft is coupleable to a complementary connector of a power take-off device of a vehicle.

2. The kit of claim 1, wherein the first end includes a first mechanical coupler adapted to be directly and rotatably coupled with the complementary connector of the generator and wherein the second end includes a second mechanical coupler adapted to be directly coupled to the complementary connector of the power take-off device.

3. The kit of claim 1, wherein the generator includes an outer mating fixture surrounding the complementary connector of the generator and wherein a first end of the flexible driveshaft further comprises a flexible drive cable outlet directly coupled to the outer sheath and adapted to be coupled to and around the outer mating fixture, and where the flexible drive cable outlet surrounds an outer circumference of the first end of the inner shaft.

4. The kit of claim 3, wherein the flexible drive cable outlet includes a quick release tab extending outwardly from one side of the flexible drive cable outlet perpendicular to the complementary connector of the generator.

5. The kit of claim 1, wherein the outer sheath is stationary relative to rotation of the inner shaft and wherein the outer sheath and inner shaft are concentric with one another.

6. The kit of claim 1, wherein an outer circumference of the inner shaft is surrounded by and attached to an internal drive cable liner, and wherein an outer circumference of the internal drive cable liner is surrounded by the outer sheath.

7. The kit of claim 1, wherein the generator further includes an output complementary connector coupled to a power output cable, the power output cable including a cable coupling coupleable to a power input of an electrical device.

8. The kit of claim 1, wherein the second end of the inner shaft is rotatably coupleable to the complementary connector of the power take-off device and wherein the inner shaft is rotatable upon receiving a torque output from the power take-off unit.

9. The kit of claim 8, wherein the first end of the inner shaft rotates the complementary connector of the generator in order to actuate an alternator of the generator to provide electricity to an electric device coupled to an output complementary connector of the generator.

10. The kit of claim 1, wherein the generator further includes a cover encasing a frame of the generator.

11. A kit, comprising:
a portable generator including a first complementary connector and an outer mating fixture surrounding the complementary connector; and
a flexible driveshaft comprising:
a non-rotatable outer sheath;
a rotatable inner shaft surrounded by the outer sheath and including a first end with a first coupler adapted to couple to the first complementary connector; and
a flexible drive cable outlet directly coupled to the outer sheath and surrounding the first end of the inner shaft, the flexible drive cable outlet adapted to couple to the outer mating fixture.

12. The kit of claim 11, wherein the portable generator weighs less than 50 pounds.

13. The kit of claim 11, wherein the inner shaft includes a second end with a second coupler adapted to couple to a second complementary connector of a power take off unit.

14. The kit of claim 13, wherein the inner shaft is rotatable upon receiving torque from the power take off unit when the first end of the inner shaft is coupled to the first complementary connector of the generator and the second end of the inner shaft is coupled to the second complementary connector of the power take off unit, and the engine is firing.

15. The kit of claim 11, wherein the outer sheath of the flexible driveshaft comprises anisotropic fibers.

16. The kit of claim 11, wherein the flexible drive cable outlet comprises a quick release tab extending outwardly from an outer surface of the flexible drive cable outlet, and where the quick release tab is in a locked position when the first end of the inner shaft is mechanically coupled to the first complementary connector of the generator.

17. A system for a vehicle, comprising:
a vehicle including a power take-off unit (PTU) including an output complementary connector;
a portable generator including an input complementary connector; and
a flexible driveshaft comprising an outer sheath and an inner, rotatable mandrel, the mandrel including a first end with a first coupler adapted to couple to the input complementary connector and a second end with a second coupler adapted to couple to the output complementary connector of the PTU.

18. The kit of claim 17, wherein the mandrel may receive torque from the power take off unit in any vehicle gear.

19. The system of claim 17, wherein the outer sheath surrounds an outer circumference of the mandrel, wherein the mandrel is rotatable within the outer sheath, and wherein the outer sheath is non-rotatable relative to rotation of the mandrel.

20. The system of claim 17, wherein the mandrel is actuated to rotate when an engine of the vehicle is firing, the second end of the mandrel is coupled to the output complementary connector of the PTU, the first end of the mandrel is coupled to the input complementary connector of the generator, and the generator is activated.

* * * * *